(12) United States Patent
Ledoux (10) Patent No.: US 6,299,803 B1
(45) Date of Patent: Oct. 9, 2001

(54) METHOD FOR FORMING AND SEALING PIPE LINERS

(76) Inventor: Patrick Ledoux, 1520 S. Eugene St., Baton Rouge, LA (US) 70806

( * ) Notice: Subject to any disclaimer, the term of this patent is extended or adjusted under 35 U.S.C. 154(b) by 0 days.

(21) Appl. No.: 09/422,426

(22) Filed: Oct. 21, 1999

(51) Int. Cl.[7] ................................................... B29C 63/34
(52) U.S. Cl. ......................... 264/35; 156/287; 156/294; 264/269; 264/516; 264/36.17
(58) Field of Search ................................ 264/269, 516, 264/35, 36.17, 36.16, 563, 564, 571, 573; 156/287, 294, 94; 138/97, 98

(56) References Cited

U.S. PATENT DOCUMENTS

| 3,429,954 | 2/1969 | Atkins . |
| 3,959,424 | 5/1976 | Dawson . |
| 4,207,130 | 6/1980 | Barber . |
| 4,366,012 | * 12/1982 | Wood ................................... 156/287 |
| 4,781,780 | * 11/1988 | Hannover ............................. 156/287 |
| 4,863,365 | 9/1989 | Ledoux . |
| 4,867,921 | 9/1989 | Steketee, Jr. . |
| 4,985,196 | 1/1991 | LeDoux . |
| 4,986,951 | 1/1991 | Ledoux . |
| 4,998,871 | 3/1991 | Ledoux . |
| 5,034,180 | 7/1991 | Steketee, Jr. . |
| 5,091,137 | 2/1992 | Ledoux . |
| 5,112,211 | 5/1992 | LeDoux . |
| 5,342,570 | 8/1994 | Ledoux . |
| 5,395,472 | 3/1995 | Mandich . |
| 5,589,131 | * 12/1996 | Steketee, Jr. ...................... 264/36.17 |

* cited by examiner

Primary Examiner—Mathieu D. Vargot (57) ABSTRACT

A method for producing temporarily deformed pipe liners from a continuously extruded thermoplastic round pipe, or thermoplastic round pipe extruded in segments of 20 to 50 feet in length and butt-fused together to obtain a pipe liner segment of a length greater than the conduit to be lined; annealing the pipe liner before deformation in a stress release chamber to relieve stresses induced in the extrusion process; collapsing the pipe liner to a flattened shape by means of internal vacuum and subsequently bending deformable portions of the flattened shape toward a back-up portion thereof, and without elongation, maintaining diameter and wall thickness; applying a sealant material on the outer pipe liner surface to seal the gap between the pipe liner and conduit.

14 Claims, 5 Drawing Sheets

METHOD FOR FORMING AND SEALING PIPE LINERS

BACKGROUND AND SUMMARY OF THE INVENTION

The invention relates to the use of thermoplastic liners for disposition within pipe lines, either initially or as a repair. In the case of new piping, the liner will protect the internal walls from deterioration, and the liner can be replaced from time to time. In the case of deteriorated or damaged piping, the liner will restore the fluid transporting capability of the pipeline and will prevent further interior deterioration. The thermoplastic pipe liner is a stand-alone product capable of carrying the mechanical forces of the piping system. The use of such a liner is presented in my previous patents, U.S. Pat. Nos. 4,863,365, 4,985,196, 4,986,951, 4,998,871, 5,091,137, 5,112,211, and 5,342,570, which teach the general concept of a deformed liner and field application for insertion into, and subsequent reshaping to its original extruded form, within the pipe as a liner. In the case of polyethylene material, the extruded tube is deformed at a temperature equal to or higher than 160° F. (crystalline point) whereat a secondary temporary shape can be maintained. In the case of PVC or PVC/Pe copolymer, the round extrudate is directly shaped into a deformed cross-section during the first cooling stage of the production line. In all cases, heat and deforming tools are required to obtain a deformed collapsed shape. The same applies during the reforming of the liner within the pipe. Heat transfer and pressure are applied to the deformed liner to erase the temporary shape and reform the liner to its original round shape. Thermoplastic materials have a high thermal coefficient of expansion. During the manufacturing and installation processes, the liner is subjected to high variations of temperature, forcing the material to expand both axially and radially. When the liner is cooled back down to ambient temperature under pressure to lock it in place, stresses are induced which cause the liner to shrink after a certain period of time. The shrinkage of the liner creates a gap between the liner and carrier pipe that can facilitate unwanted water migration in sewer and drain lines or trap gases in industrial and gas lines.

The axial shrinkage of the liner can create tremendous axial stress forces in a free-span portion of the liner. For example, in a sewer line installation with house service line connections to be reopened after lining, if the liner is free-span (no interlocking circumferential areas with the carrier pipe), the liner can develop a total circumferential crack during the cutting operation causing a full separation of several inches, or the liner can move axially, in which case the opening does not match the service line, and the flow from the house is blocked. Even in state of the art sliplining wherein smaller round polyethylene pipe is inserted into the sewer line, the shrinkage phenomenon is known and has been reported in many articles and papers. In this instance, the shrinkage comes from the extrusion process. During the extrusion process, the melted thermoplastic material is pushed through a die and tip tooling by a rotating compression screw. As a result, the extruded pipe has a angular motion up to 90 degrees per 20 to 30 feet of length which is locked into the material by the cooling process. In order to obtain the desired pipe diameter and wall thickness, the extrudate is drawn down by axial pulling, thus inducing axial and radial stresses.

It is a general object of the this invention to provide a method for producing a temporarily deformed pipe liner from extruded thermoplastic round pipe of tubular cross-section for insertion into a pipe or conduit and reformation of the deformed pipe liner to the original extruded tubular cross-section without inducing heat transfer stresses, which inventive method will eliminate the existing axial and radial stresses in extruded thermoplastic round pipe as well as any residual stresses due to butt-fuse bonding segments of extruded thermoplastic round pipe to achieve a required continuous length.

This new method for producing pipe liners described herein involves a first step of annealing the stresses induced in the extruded thermoplastic round pipe. A novel feature of this method is raising the thermoplastic pipe wall thickness temperature to a maximum of 150° F. to relax the material, then slowly cooling the thermoplastic pipe wall thickness to ambient temperature to release the stresses. Releasing the extrusion stresses facilitates the manufacturing process, since the pipe will no longer have a tendency to rotate and slip out of the rollers during the subsequent deforming process.

After annealing, and now at ambient temperature, the thermoplastic pipe liner enters the deformation process and the end which first enters the deformation process line is sealed and an internal vacuum is applied to the pipe liner to collapse the round pipe liner to a flattened ribbon shape. In order to apply and maintain the vacuum, a multi-pig is inserted inside the pipe liner from the tail end of the pipe. The pig is filled with hydraulic fluid to obtain 100% vacuum sealing in the pipe liner as it enters the deformation process. The round pipe liner enters a set of four pig-stopping rollers which alter the pipe liner from a round shape to a square shape. The purpose of these pig-stopping rollers is to stop and trap the multi-pig at a fixed position by reducing the pipe liner cross-section as the pipe liner is drawn forward through the deforming process. The suction of the applied vacuum will also draw the pig. From that fixed position, at a distance of 15 to 30 times the pipe liner diameter, a set of two flattening rollers collapse the pipe liner into a flattened ribbon shape. Farther down the line, a second set of two bending rollers fold the flattened ribbon shape into a deformed "U" shape thereby creating a temporarily deformed pipe liner. Under the vacuum, the deformed pipe liner cannot regain its round shape. In heavy wall thickness pipe liner where the spring effect forces are greater than the vacuum forces, strapping of the deformed pipe liner may be required. The deforming process is performed at a pipe liner wall thickness temperature of 100° F., at which the thermoplastic material has most of its mechanical strength properties and, therefore, can accept the mechanical deforming process without locked-in elongation stresses being induced. In the case of water and gas line liners, hydraulic fluid, or any like oil base material, cannot be used with the poly pig. To obtain 100% sealing, the number of sealing elements of the poly-pig may have to be increased.

It is also contemplated that the pipe liner may be produced in a continuous length greater than the conduit to be repaired. In this case, if a continuous extruded length of round thermoplastic pipe is not available in adequate lengths, it may be necessary to butt-fuse weld individual segments of anywhere from 20 feet to 50 feet in length in order to obtain the desired length. This welding process is another source of stress which will be relieved by the annealing process.

Another novel feature of this invention is in sewer/drain line applications where groundwater infiltration needs to be eliminated. As previously mentioned, any liner system using thermoplastic materials or thermo-setting resins is subjected to great variations in temperature during the installation process. As a result, after a certain period of time, radial shrinkage occurs which allows groundwater to flow back into the sewer line at any openings such as house connections. The new feature is to apply a specially designed grout into the inner fold of the deformed "U" cross section during the deforming process. This grout is a hydrophobic or hydrophobic polyurethane material of high viscosity which retains its properties at a temperature greater than 150° F. and can absorb 8–10 times its volume of water. After the deformed pipe liner has been inserted into a pipe or conduit and during the process of re-rounding or reforming the pipe liner to its original tubular cross section, the grout flows around the outer surface of the pipe liner sealing the gap between the pipe liner and conduit. During expansion of the pipe liner, the grout penetrates cracks and opened joints in the conduit sealing the complete system. When the grout comes in contact with water it turns into a foam. Due to its thermal expansion coefficient, the pipe liner might shrink, but the grout will compensate for any shrinkage and keep the system sealed.

At the start-up of the deformation process, the end of the pipe liner to first enter the process is sealed by a 450° F. molding press at a pressure of 100 bars. An electro-fused saddle coupling is installed on one side of the pipe liner near the sealed end and connected to the vacuum pump via a shut-down valve. At the other end of the deformed pipe liner segment, a pulling head is inserted in the inner-fold and the liner is thermo-sealed by fusion at a temperature of 450° F. and a pressure of 100 bars, whereby the pulling head becomes part of the pipe liner.

Once the desired length of temporarily deformed pipe liner has been produced and sealed as above described, it is packaged on a reel or coiled. Another novel feature of this process is that the applied vacuum pre-stresses the pipe liner, allowing it to be bent on a smaller radius. Thermoplastic material cannot withstand much axial compression. As a result, the pipe liner, as well as a round pipe, will buckle when the compression forces due to the bending are greater than the compression forces the material can support. Maintaining the applied vacuum axially compresses the material and creates a pre-stress condition whereby the difference between the area under compression versus the area under elongation is minimized, increasing the inert cross-section. Consequently, the pipe liner can be bent on a much smaller radius without buckling, therefore larger size pipe liner can be coiled and packaged in sizes transportable by common carrier. For smaller size pipe liner, longer continuous lengths can be coiled on a regular size reel.

At the job site, once the pipe liner is threaded by a pulling winch through the conduit to be repaired, the pulling head is severed at the downstream end to release the vacuum. At the upstream end, the thermo-seal plug is cut off. The pipe liner regains its original round shape by itself but will be locked by the carrier pipe in a somewhat deformed configuration. End-fitting couplings are attached to both ends of the pipe liner, and a soft-pig is propelled by pressurized air through the entire length to re-round the pipe liner. During re-rounding of the pipe liner in a sewer line rehabilitation, the hydrophilic/hydrophobic grout material flows freely around the pipe liner turning to foam when it comes into contact with water, thus sealing the gap between the pipe liner and carrier pipe or conduit. Steam is then introduced into the pipe liner to mold it to the internal contours of the carrier pipe or conduit. The hydrophilic/hydrophobic foam is squeezed into cracks and openings. The pipe liner is cooled down slowly by air to ambient temperature. The amount of shrinkage due to heat transfer is minimized compared to other pipe lining systems that depend solely on heat to unfold the pipe liner.

In previous pipe liner systems, if there is cold water present in the conduit to be repaired (i.e. low spot or active service line), the pipe liner material is not uniformly subjected to temperature elevation. When pressure is applied to unfold the pipe liner, the hottest part of the pipe liner cross-section will unfold and elongate and, over time, considerable shrinkage will occur. In this new pipe lining system, since the pipe liner is unfolded at ambient temperature, there is no thermal expansion.

In the case of sewer and drain lines where the inside diameter of the conduit has large variation, the pipe liner has an outside diameter slightly smaller than the conduit's inside diameter. The liner needs to be expanded to obtain a tight fit and minimize the gap between the pipe liner and the conduit. In the case of pressure pipe application, the pipe liner's outside diameter can be manufactured more precisely, since there is significantly less variation to the inside diameter of the conduit. In this application, the pipe liner does not need to be molded to the contours of the conduit, and the hydrophilic or hydrophobic material is not needed.

DETAILED DESCRIPTION OF THE INVENTION

Figure 1:
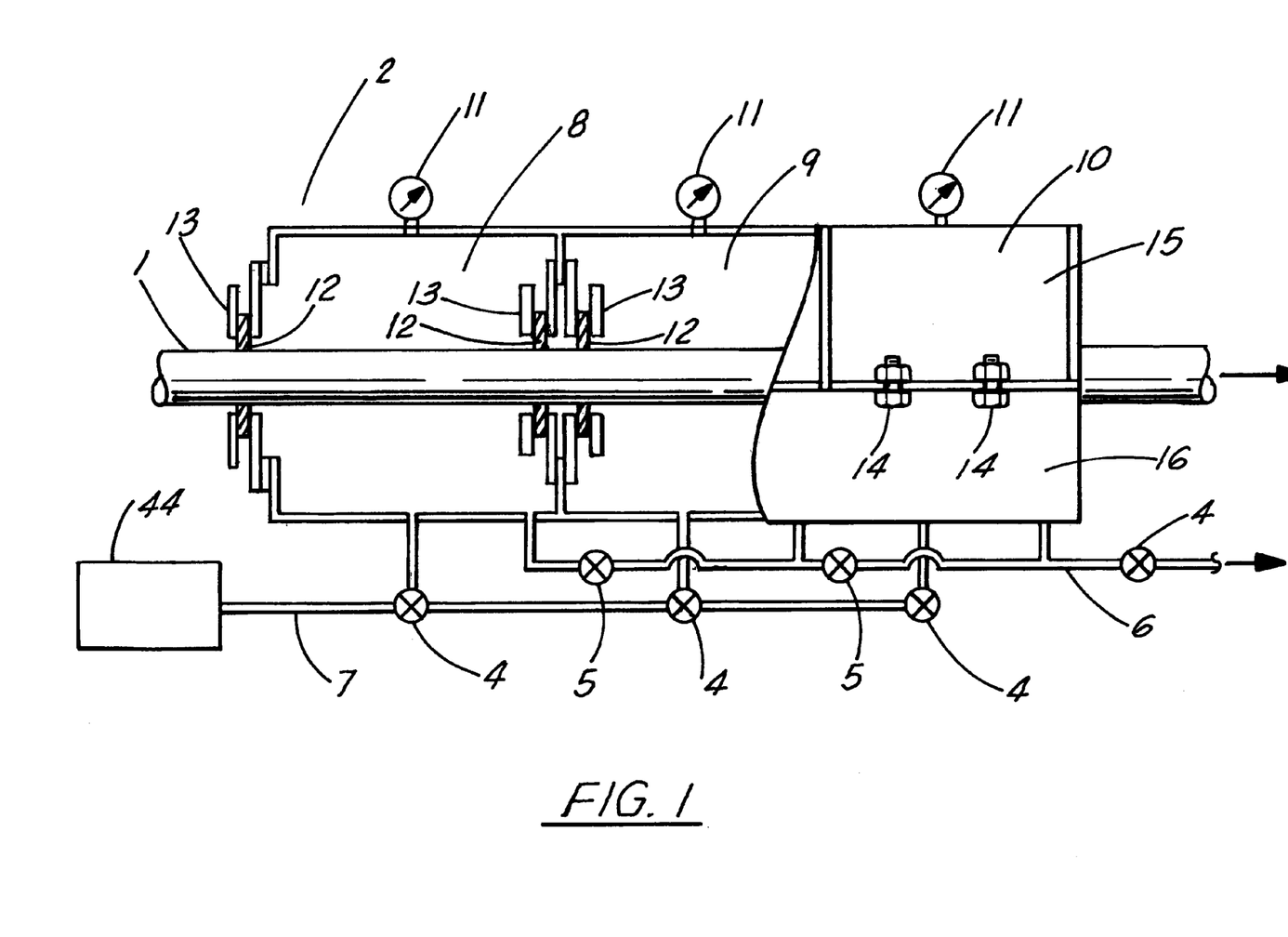
FIG. 1 is a partial cross section and partial side view of a stress release chamber.

Referring now to the drawings, FIG. 1 shows a partial cross section and partial side view of a stress release chamber 2 which is used to anneal extruded thermoplastic round pipe 1 before the deformation process. The round pipe 1 moves through the stress release chamber 2 in the direction indicated by an arrow in FIG. 1, starting in the entry zone 8, then to the intermediate zone 9 and finally to the exit zone 10 before exiting the stress release chamber 2. Before entering the stress release chamber 2, it is anticipated that the round pipe 1 will be in such continuous length as required for any particular application. Although not shown, stock segments of extruded thermoplastic round pipe available in lengths between 20 and 50 feet may be butt-fuse welded to obtain the desired continuous length. Such welding would be done before the annealing process. Although not shown, drawing means will be provided to move the round pipe 1 through the stress release chamber 2 as well as further steps in the deformation process.

The embodiment of stress release chamber 2 shown in FIG. 1 is heated by steam produced by a steam generator 44 through a steam line 7 which directs steam through pressure valves 4 into the entry zone 8, the intermediate zone 9 and finally the exit zone 10. Steam condensate will be collected in a condensate line 6 and the condensate will be prevented from flowing from one zone to another by a series of check valves 5. The condensate will be released by a pressure valve 4. The entry zone 8 will have the highest temperature. The intermediate zone 9 will have the next highest temperature and the exit zone 10 will have the lowest temperature. Each zone will be fitted with a temperature gage 11 to monitor the temperature within the respective zones. A typical operating condition would have the temperature gage 11 fitted to the entry zone 8 giving a reading of 250° F., the temperature gage 11 fitted to the intermediate zone 9 giving a reading of 225° F., and the temperature gage 11 fitted to the exit zone 10 giving a reading of 200° F. These temperature readings are noted only as illustrative of one embodiment of a stress release chamber 2. It is intended that the wall thickness temperature of the extruded thermoplastic round pipe 1 be raised to no more than 150° F. and then gradually cooled to ambient temperature.

The embodiment of a stress release chamber 2 shown in FIG. 1 is shown with an upper half 15 and a lower half 16 which are held in position by locking devices 14. Also shown in FIG. 1 is a series of adapters 13 fitted with seals 12. The adapters 13 with fitted seals 12 allow the stress release chamber 2 to be used to anneal extruded thermoplastic round pipe 1 of different diameters. The seals 12 prevent the leakage of steam and heat from the stress release chamber 2 to the outside as well as prevent the leakage of steam and heat from one zone to another.

Figure 2:
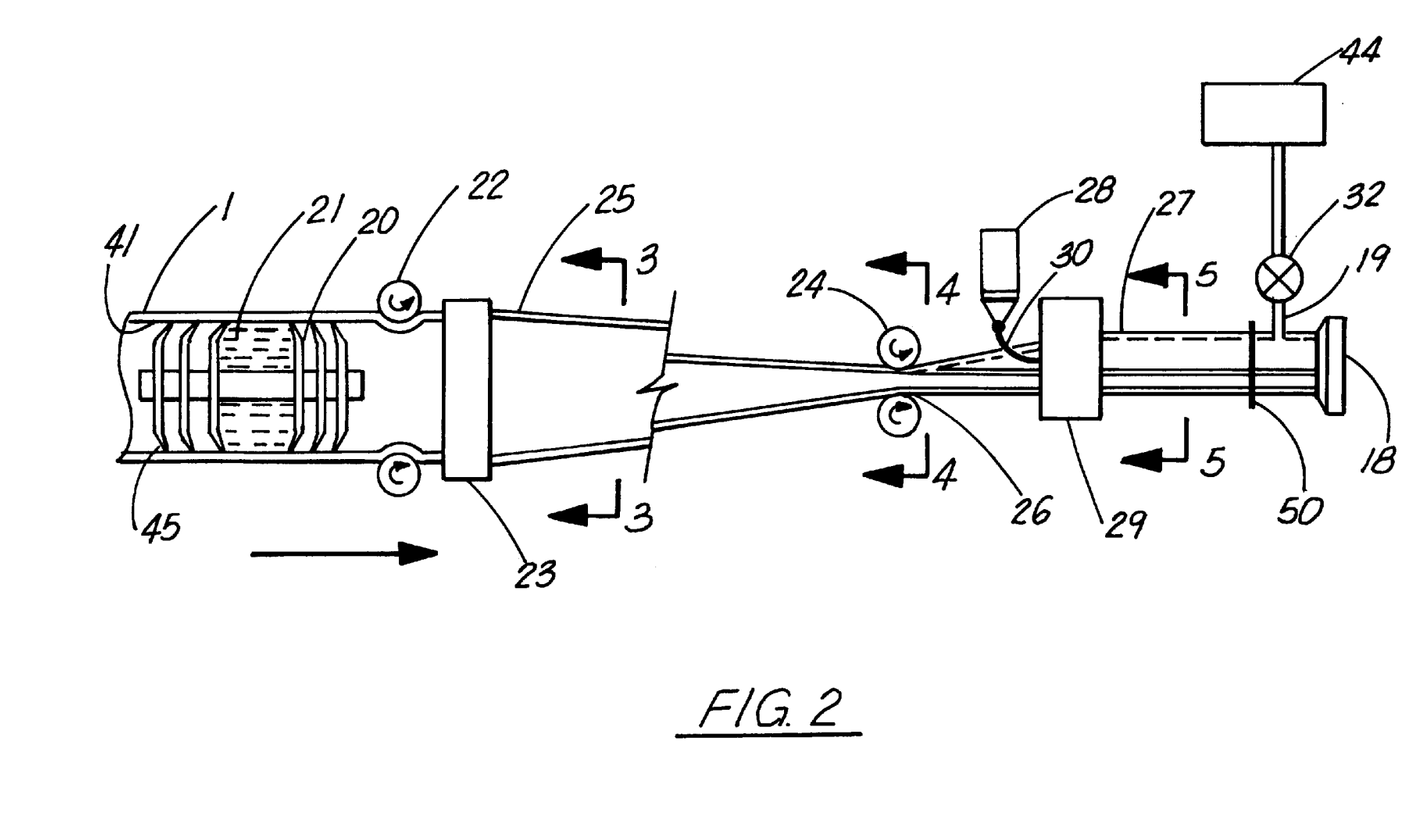
FIG. 2 is a side view of the pipe liner deforming apparatus.

FIG. 2 shows a side view of the apparatus for deforming the extruded thermoplastic round pipe 1 after the annealing process to produce a temporarily deformed pipe liner. The end of the extruded thermoplastic round pipe 1 after the annealing process which first enters the deforming process is thermo-sealed to form a thermo-sealed end 18. In one embodiment of this step, the thermo-seal is accomplished by 450° F. molding press at a pressure of 100 bars. An electro fused saddle coupling is installed on one side of the round pipe 1 near the thermo-sealed end 18, and connected to a vacuum pump 44 through a vacuum line 19 and vacuum valve 32 and an internal vacuum is applied to the round pipe 1 to collapse or assist in the collapse of the round pipe 1. This internal vacuum is maintained throughout the entire deformation process. In order to apply and maintain a vacuum within the round pipe 1 during the deformation process, a multi-pig 20 is inserted into the round pipe 1. The multi-pig 20 is filled with hydraulic or oil based fluid 21 to provide a moveable but complete vacuum seal around the inner surface 41 of the round pipe 1 as it enters the deformation process. In those instances where the pipe liner will used within water and gas pipe lines or conduit, the use of hydraulic or oil based fluid 21 would be unsuitable and a different embodiment of the multi-pig 20 would be used with additional sealing elements 45 but without hydraulic or oil based fluid 21. As the round pipe 1 enters the deformation process in the direction indicated by an arrow in FIG. 2, it passes through a series of rollers which begin and assist in the deformation process and serve to stop and trap the multi-pig 20 in a fixed position. One embodiment of these rollers is shown in FIG. 2 as a set of two horizontal pig-stopping rollers 22 and a set of two vertical pig-stopping rollers 23. The clearance between the rollers in each set is less than the outer diameter of the round pipe 1 thus causing the round pipe 1 to deform into an essentially square shape. In addition, the horizontal pig-stopping rollers 22 and the vertical pig-stopping rollers 23 stop and trap the multi-pig 20 in a fixed position as the round pipe 1 is drawn over the multi-pig 20 and through the deforming process. The suction of the applied internal vacuum will also draw the multi-pig 20 toward the pig-stopping rollers 22 and 23. Although not shown, drawing means will be provided to move the round pipe 1 through the deformation process.

Figure 3:
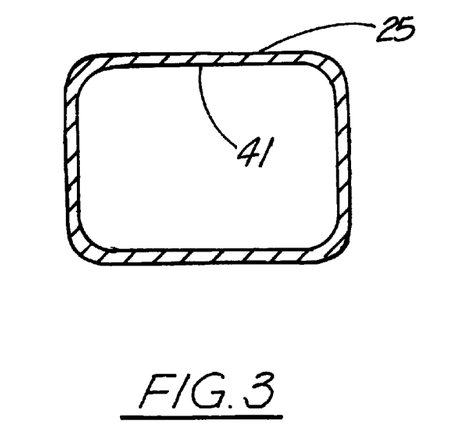
FIG. 3 is a cross sectional view of the pipe liner beginning the deformation process.
Figure 4:
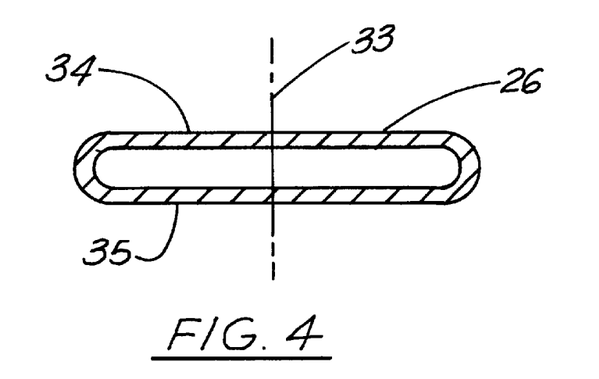
FIG. 4 is a cross sectional view of the flattened ribbon shape.

At a distance of 15 to 30 times the outer diameter of the round pipe 1 from the fixed position of the multi-pig 20 or the pig-stopping rollers 22 and 23, the deforming round pipe 1, now becomes a collapsing pipe liner 25 as shown in cross section in FIG. 3, and will be drawn through flattening rollers 24 to produce a flattened pipe liner 26 of flattened ribbon shape with a top side 34 and a bottom side 35, shown in cross section in FIG. 4.

Figure 5:
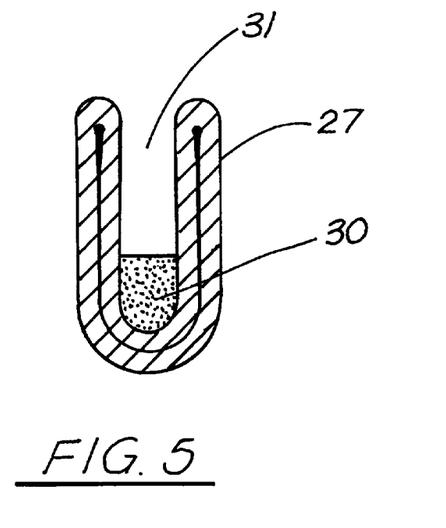
FIG. 5 is the deformed "U" cross section.

The flattened pipe-liner 26 is then drawn toward and through bending rollers 29 which fold the flattened pipe liner 26 into a deformed "U" shape pipe liner 27 which is shown in cross section in FIG. 5. As shown in FIG. 4, the cross section of the flattened pipe liner 26 is symmetrical about a plane of bilateral symmetry 33. When drawn through the bending rollers 29, the bottom side 35 of the flattened pipe liner 26 is folded along the plane of bilateral symmetry 33 to create the deformed "U" shape pipe liner 27 with an inner fold 31 adjacent to what was the top side 34 of the flattened pipe liner 26. Because of the applied internal vacuum, the deformed "U" shape pipe liner 27, cannot regain its round shape except where the wall thickness of the round pipe is large enough to create spring forces greater than the force of the vacuum. In such a case, straps 50 may be used to retain the deformed "U" shape.

In an alternative embodiment a hydrophilic material bead injector 28 is installed to inject a bead of hydrophilic material 30 into the inner fold 31.

When the required length of deformed "U" shape pipe liner 27 has been produced a pulling head is inserted in the inner fold 31 at the end of the deformed "U" shape pipe liner 27 opposite the thermo-sealed end 18, and the deformed "U" shape pipe liner 27 is thermo-sealed at that end by fusion at temperature of 450° F. and a pressure of 100 bars and the pulling head becomes a part of the deformed "U" shape pipe liner 27. The pulling head serves as an attachment for pulling means such as a pulling winch to pull the deformed "U" shape pipe liner 27 through a conduit at a job site for positioning within the conduit before the deformed "U" shape pipe liner 27 is unfolded and reshaped as discussed below.

When the required length of deformed "U" shape pipe liner 27 has been produced and sealed as above described it is packaged on a reel or coiled for subsequent transport to a particular job site. Once at the job site, the deformed "U" shape pipe liner 27 is unspooled from the reel or coil and threaded through a conduit 38 with the pulling head entering first and being pulled by a pulling winch until the deformed "U" shape pipe liner 27 is fully in position within the conduit 38. Once in position, the pulling head is severed to release the vacuum retained within the deformed "U" shape pipe liner 27 and the thermo-sealed end 18 is cut off. With the release of vacuum, the deformed "U" shape pipe liner 27 will regain its original round configuration but with some deformation.

Figure 6:
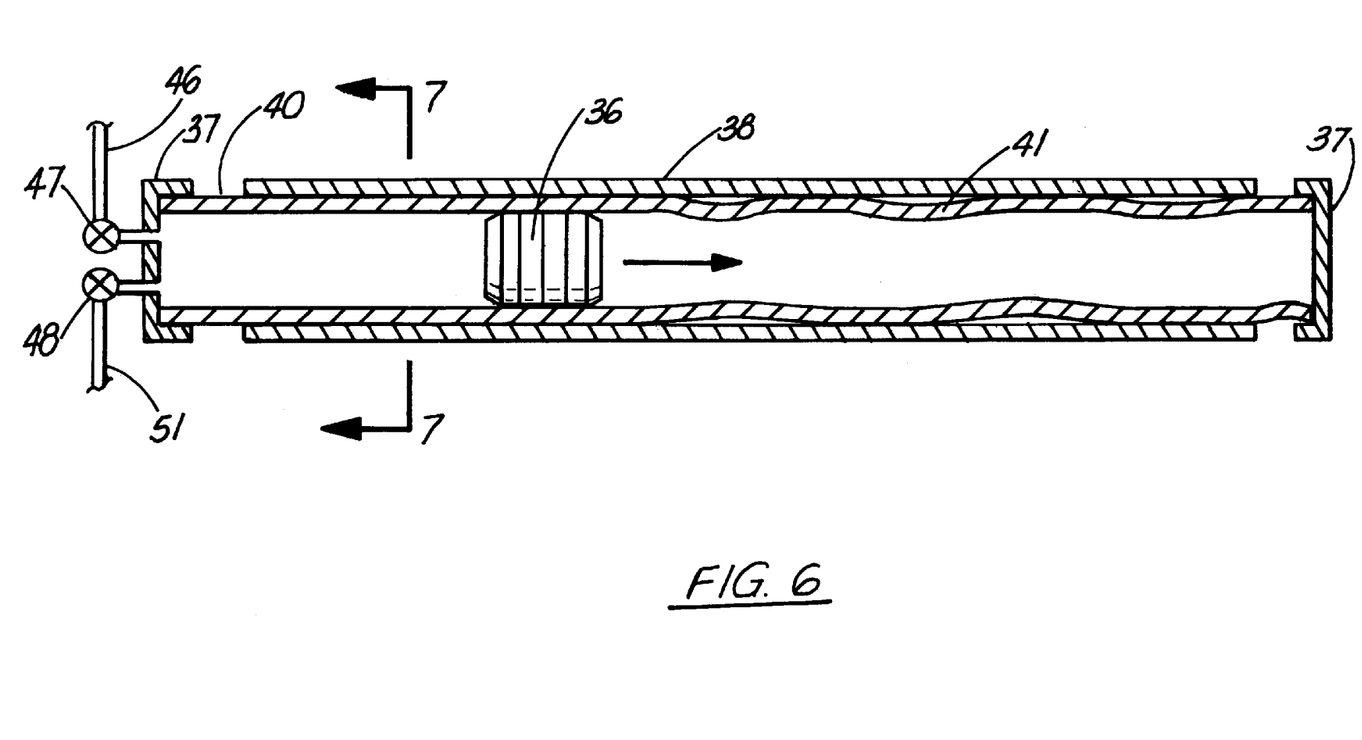
FIG. 6 is a cross sectional view of a "soft-pig" unfolding a deformed pipe liner within a conduit.

FIG. 6 shows a cross section of a conduit with a pipe liner in place. An unfolded pipe liner with minor deformation 41 is shown in place within the conduit 38. End fitting couplings 37 are attached to both ends of the unfolded pipe liner with minor deformation 41 and a soft-pig 36 is propelled through the unfolded pipe liner with minor deformation 41 to re-round the pipe liner and produce the re-rounded liner 40. The soft-pig 36 is propelled by compressed air through a compressed air fitting 46 and controlled by a control valve 47. During the unfolding and re-rounding process, hydrophilic material 30, if inserted into the inner fold 31 during the folding process, flows freely around the pipe liner and turns to foam 49 when it comes into contact with water, thus sealing any gap between the re-rounded pipe liner 40 and the conduit 38. Steam is then applied into the re-rounded pipe-liner 40 through a steam fitting 51 and controlled by a steam valve 48 to mold the re-rounded liner to the internal contours of the conduit 38. The foam 49 is squeezed into cracks and openings in the conduit 38. The re-rounded pipe liner 40 is then allowed to cool by air to ambient temperature.

Figure 7:
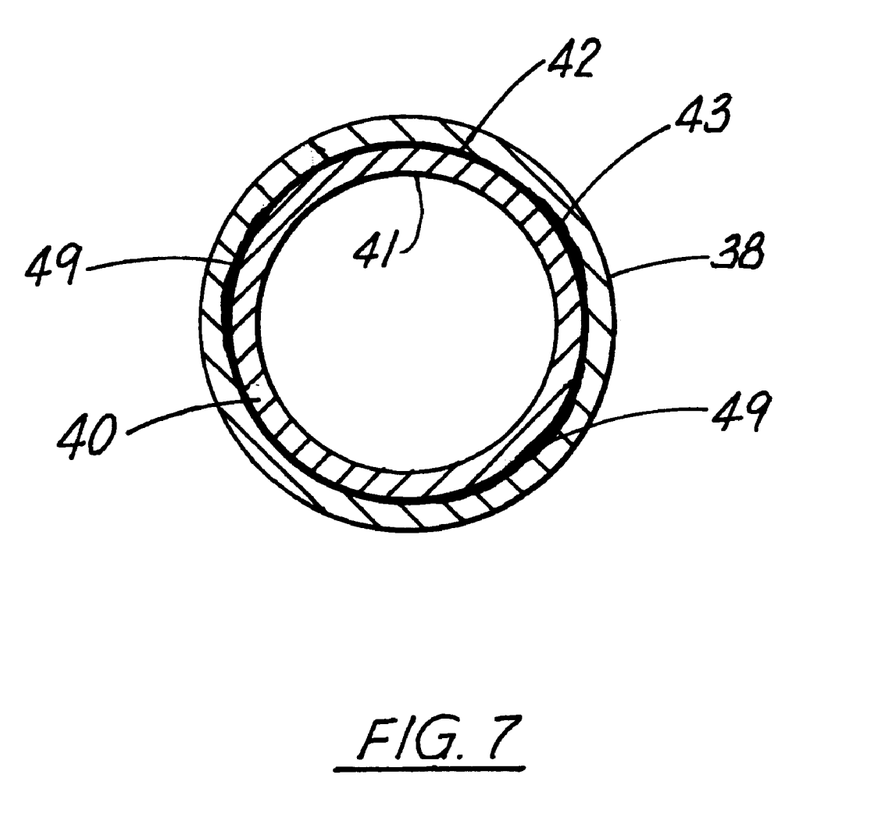
FIG. 7 is a cross sectional view of a pipe liner in place in a conduit with hydrophilic material sealing.

FIG. 7 is a cross section of the re-rounded pipe liner 40 in place in a conduit 38 with foam 49 sealing. As shown the re-rounded pipe liner 40 has an inner surface 41 and an outer surface 42. The outer surface 42 is adjacent to the inner surface of the conduit 43. Any gaps or discontinuities between the outer surface 42 and the inner surface 43 are filled with foam 49 and sealed.

What is claimed is:

1. A method for producing a temporarily deformed pipe liner from extruded thermoplastic round pipe of tubular cross-section with an inner and outer surface for insertion into a conduit with an inner and outer surface and reformation of the deformed pipe liner to said extruded tubular cross-section without inducing heat transfer stresses, comprised of the following steps:
   a) Annealing existing axial and radial stresses in the extruded thermoplastic round pipe induced during the extrusion process and induced during butt-fuse bonding of segments of said round pipe to obtain the desired length of pipe liner;
   b) After annealing, collapsing the round pipe at ambient temperature into a flattened ribbon shape with top and bottom sides by means of localized internal vacuum;
   c) After collapsing the round pipe into a flattened ribbon shape, folding the bottom side of the flattened ribbon shape along a plane of bilateral symmetry thereby creating an inner fold within the top side of the flattened ribbon shape, and reducing the cross-sectional configuration of the flattened ribbon shape into a deformed "U" section, while maintaining an internal vacuum to lock the pipe in a deformed configuration;
   d) Injecting a bead of hydrophilic material into the inner fold of the deformed "U" cross-section;
   e) Maintaining the internal vacuum throughout deformation of the round pipe including packaging, thereby further reducing the cross-section;
   f) Coiling the deformed pipe liner while maintaining the internal vacuum to axially pre-stress the deformed section to obtain a smaller bending radius without buckling the deformed pipe liner for shipping to a job site;
   g) At the job site, drawing the deformed pipe liner through a conduit to be repaired;
   h) unfolding the deformed pipe liner in the conduit by releasing the internal vacuum.

2. The process according to claim 1 wherein the step of collapsing the round pipe further comprises the steps of inserting a multi-pig to seal the internal vacuum and drawing the pipe through pig-stopping rollers and then drawing the pipe through flattening rollers.

3. The process according to claim 1 wherein the step of folding the bottom side of the flattened ribbon shape further comprises the step of drawing the flattened ribbon shape through bending rollers.

4. The process according to claim 1 wherein the step of unfolding the deformed pipe liner in the conduit further comprises the steps of propelling a soft-pig with pressurized gas to allow the deformed pipe liner to regain its tubular cross-section configuration, without heat transfer.

5. The process according to claim 1 wherein the step of unfolding the deformed pipe liner in the conduit further comprises the steps of introducing steam into the pipe liner to mold it to the contours of the conduit and allowing the liner to cool by air to ambient temperature to minimize shrinkage due to heat transfer.

6. The process according to claim 1 further comprising the step of sealing the outer surface of the pipe liner to the inner surface of the conduit with the hydrophilic material placed in the inner fold of the deformed pipe liner which hydrophilic material flows around the outer surface of the unfolded pipe liner, expands upon contact with water and fills any gaps between the outer surface of the pipe liner and the inner surface of the conduit.

7. A method for producing a temporarily deformed pipe liner from extruded thermoplastic round pipe of tubular cross-section with an inner and outer surface for insertion into a conduit with an inner and outer surface and reformation of the deformed pipe liner to said extruded tubular cross-section without inducing heat transfer stresses, comprised of the following steps:
   a) Annealing existing axial and radial stresses in the extruded thermoplastic round pipe induced during the extrusion process and induced during butt-fuse bonding of segments of said round pipe to obtain the desired length of pipe liner;
   b) After annealing, collapsing the round pipe at ambient temperature into a flattened ribbon shape with top and bottom sides by means of localized internal vacuum;
   c) Maintaining the internal vacuum in the flattened ribbon shape during packaging and shipping to a job site;
   d) At the job site, folding the bottom side of the flattened ribbon shape along a plane of bilateral symmetry thereby creating an inner fold within the top side of the flattened ribbon shape, and reducing the cross-sectional configuration of the flattened ribbon shape into a deformed "U" section; while maintaining an internal vacuum to lock the pipe in a deformed configuration;
   e) drawing the deformed pipe liner through a conduit to be repaired;
   h) unfolding the deformed pipe liner in the conduit by releasing the internal vacuum.

8. The process according to claim 7 wherein the step of collapsing the round pipe further comprises the steps of inserting a multi-pig to seal the internal vacuum and drawing the pipe through pig-stopping rollers and then drawing the pipe through flattening rollers.

9. The process according to claim 7 wherein the step of folding the bottom side of the flattened ribbon shape further comprises the step of drawing the flattened ribbon shape through bending rollers.

10. The process according to claim 7, wherein the step of folding the flattened ribbon shape further comprises the step of injecting a bead of hydrophilic material into the inner fold of the deformed "U" cross-section.

11. The process according to claim 7 wherein the step of unfolding the deformed pipe liner in the conduit further comprises the steps of propelling a soft-pig with pressurized gas to allow the deformed pipe liner to regain its tubular cross-section configuration, without heat transfer.

12. The process according to claim 7 wherein the step of unfolding the deformed pipe liner in the conduit further comprises the steps of introducing steam into the pipe liner to mold it to the contours of the conduit and allowing the liner to cool by air to ambient temperature to minimize shrinkage due to heat transfer.

13. The process according to claim 10 further comprising the step of sealing the outer surface of the pipe liner to the inner surface of the conduit with the hydrophilic material placed in the inner fold of the deformed pipe liner which hydrophilic material flows around the outer surface of the unfolded pipe liner, expands upon contact with water and fills any gaps between the outer surface of the pipe liner and the inner surface of the conduit.

14. The process according to claim 1 wherein the step of coiling the deformed pipe liner further comprises the step of strapping the deformed pipe liner to maintain the deformed "U" cross section in heavy wall pipe liner.

* * * * *